Dec. 3, 1968 W. A. J. WESTOVER 3,414,828

FREQUENCY-SHIFT DATA RECEIVER

Filed June 30, 1965 2 Sheets-Sheet 1

INVENTOR
WILLIAM ALFRED JOHN WESTOVER
BY Kirschstein, Kirschstein & Ottinger
ATTORNEYS Dec. 3, 1968 W. A. J. WESTOVER 3,414,828

FREQUENCY-SHIFT DATA RECEIVER

Filed June 30, 1965 2 Sheets-Sheet 2

INVENTOR
WILLIAM ALFRED JOHN WESTOVER
BY Kirschstein, Kirschstein & Ottinger
ATTORNEYS

United States Patent Office 3,414,828
Patented Dec. 3, 1968

3,414,828

FREQUENCY-SHIFT DATA RECEIVER

William Alfred John Westover, Coventry, England, assignor to The General Electric Company Limited, London, England

Filed June 30, 1965, Ser. No. 468,499
Claims priority, application Great Britain, July 3, 1964, 27,554/64
6 Claims. (Cl. 329—134)

ABSTRACT OF THE DISCLOSURE

A frequency-shift data receiver in which a bistable circuit formed by a pair of transistors having a common emitter resistor is arranged to be triggered by the input signal. The bistable circuit normally supplies a signal having a square waveform and a fundamental frequency that at any instant is the same as that of the input signal, this signal being supplied to the frequency discriminator of the receiver. If, however, the level of the input signal is too low, the bistable circuit is not triggered and no signal is passed on to the discriminator. The bistable circuit thus provides a threshold level below which the receiver is operative and ensures that the receiver does not give a false output in respect of low level input signals.

Figures 1, 3:
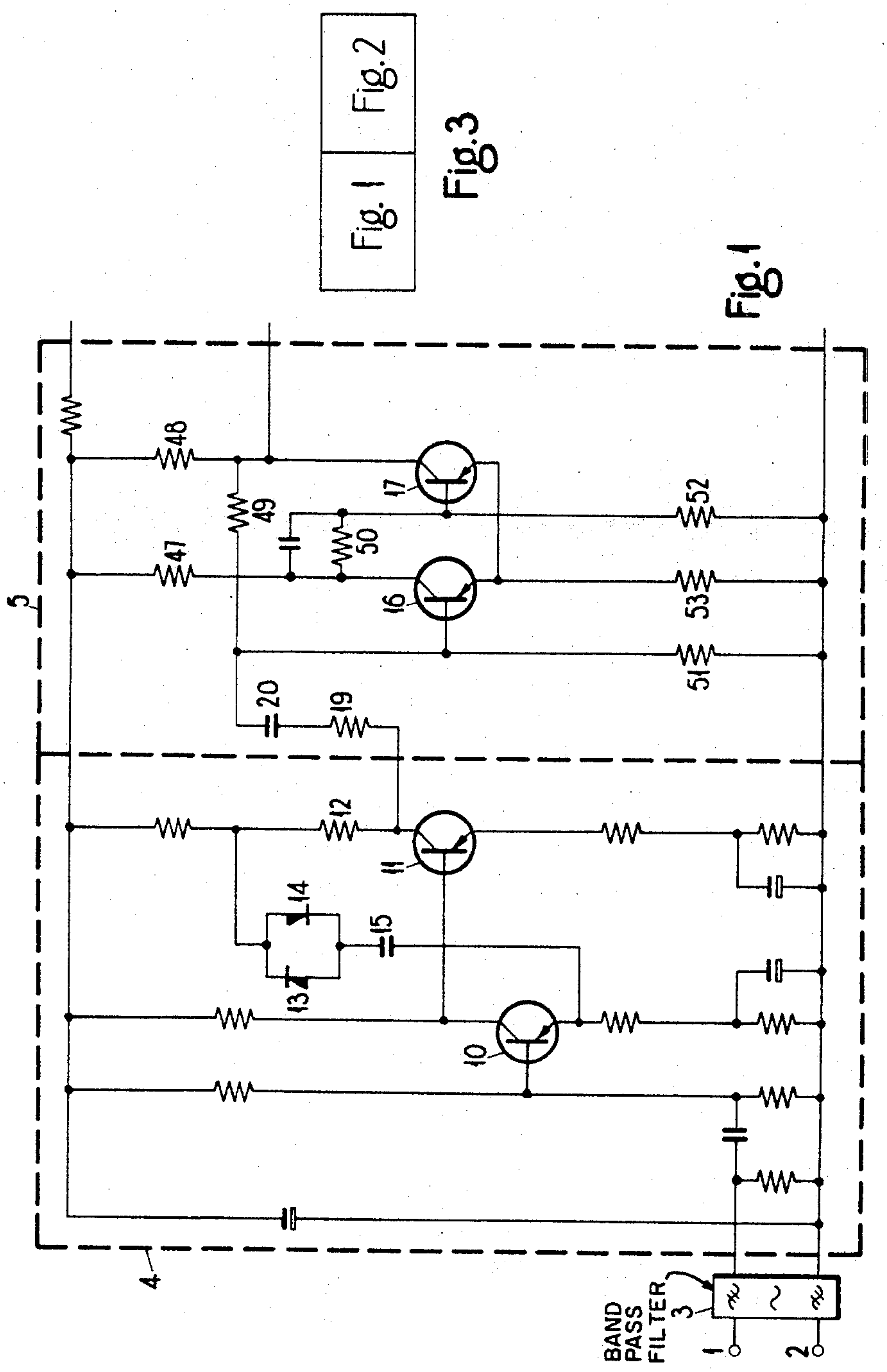

This invention relates to amplitude discriminators for use in electric signal receivers.

More particularly this invention relates to amplitude discriminators of the type for use in electric signal receivers which, during use, form part of a data transmission system (for example a telegraphy system) using frequency-shift signalling.

In one such system information is transmitted by the transmission of a voice frequency signal which, at any instant, may have either one of two different frequencies, the frequency of the transmitted signal being keyed between these two different frequencies in dependence upon the information being transmitted.

At the receiver the transmitted signal is used to control an output relay in dependence upon the frequency of the transmitted signal at any instant, the frequency of the transmitted signal being detected by means of a frequency discriminating arrangement.

The attenuation/frequency characteristics of such a system are often such that the parts of the transmitted signal having the two different frequencies respectively may be greatly different in amplitude on arrival at the receiver, and therefore the transmitted signal is passed to the frequency discriminator by way of an amplitude limiter which serves to make all parts of the signal supplied to the frequency discriminator of the same amplitude. If, however, the amplitude of any part of the signal arriving at the amplitude limiter is below the limiter's limiting level, this part passes on to the frequency discriminator where it may produce undesirous results.

In order to overcome this problem there is often provided means to detect the amplitude of the transmitted signal on arrival at the receiver, and to inhibit operation of the output relay when the amplitude falls below some predetermined level, irrespective of the frequency of the received signal.

It is an object of the present invention to provide an amplitude discriminator of the type specified, which amplitude discriminator may be used to replace the amplitude limiter and means to detect the amplitude of the transmitted signal on arrival at the receiver used in the above described system.

According to one aspect of the present invention, an amplitude discriminator of the type specified comprises a bistable circuit which, during use, is arranged to be triggered from one of its stable states to the other and back again continuously in dependence upon the instantaneous amplitude of the received signal, said bistable circuit being so triggered only when the amplitude of the received signal is above a predetermined value, and said bistable circuit when so triggered operating to supply a a square-wave output signal of substantially constant amplitude.

Said bistable circuit may be triggered by a single signal derived from the received signal by way of an amplifying arrangement or said bistable circuit may be triggered by two anti-phase signals derived from the received signal by way of a phase-splitting arrangement.

According to another aspect of the present invention, an amplitude discriminator of the type specified comprises first and second transistors each having three electrodes, a first resistive element connecting a first electrode of each transistor to a first point, second and third resistive elements connecting a second electrode of each transistor respectively to a second point, connections between the second electrode of each transistor and the third electrode of each other transistor, and means to provide a potential difference between said first and second points, the arrangement being such that in response to a signal supplied to the third electrode of said first transistor, or two signals supplied to the third electrode of each of said first and second transistors respectively, said bistable circuit may be triggered from a first stable condition in which said first transistor is conducting and said second transistor is not conducting to a second stable condition in which said second transistor is conducting and said first transistor is not conducting and back again continuously in dependence upon the instantaneous amplitude of said signal or signals, said bistable circuit being so triggered only when the amplitude of said signal or signals is above a predetermined value, and said bistable circuit when so triggered operating to supply a square-wave output signal of substantially constant amplitude, which output signal is derived from the second electrode of one of said transistors.

Figure 4:
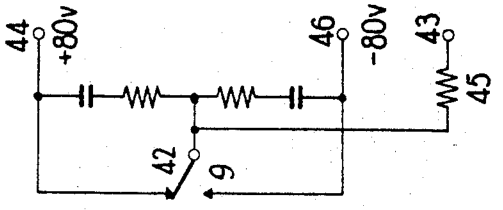
Figure 2:
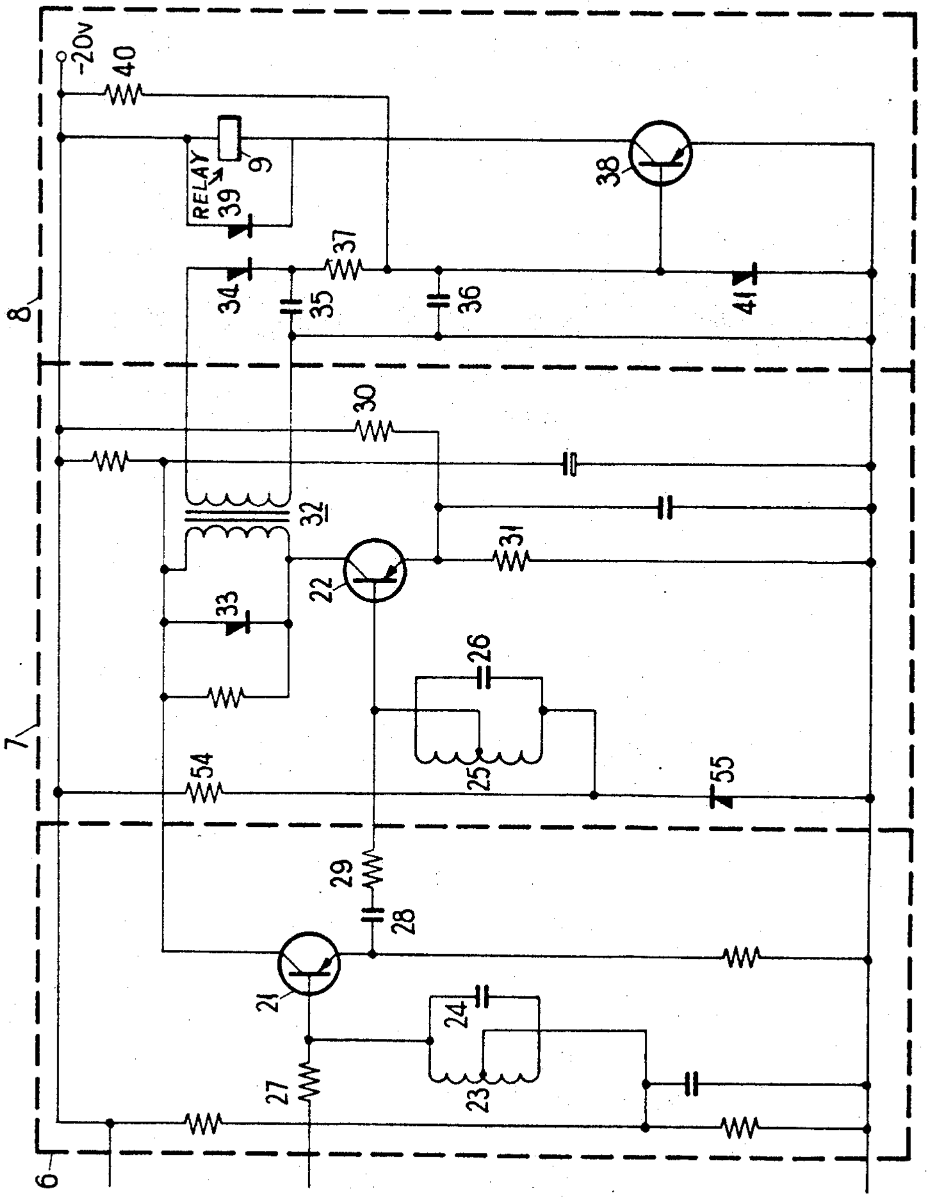

One embodiment of an electric telegraph receiver for use in a void frequency telegraphy system using frequency-shift signalling, the receiver including an amplitude discriminator in accordance with the present invention, will now be described by way of example with reference to the accompanying drawings in which:

FIGURE 1 is a circuit diagram of part of the receiver, including the amplitude discriminator, FIGURE 2 is a circuit diagram of the remainder of the receiver, FIGURE 3 is a diagram showing how to arrange FIGURES 1 and 2 with respect to one another to give the complete circuit and FIGURE 4 shows the output circuit of the receiver.

Referring now to the drawings, the received voice frequency signal, which at any instant has one or other of two frequencies which are 30 cycles per second above and 30 cycles per second below the mid-channel frequency respectively in dependence upon the information being transmitted, is supplied to input terminals 1 and 2, from which it passes by way of an appropriate band-pass filter 3 to an amplifier stage 4. The output signal from the amplifier stage 4 is supplied to the amplitude discriminator 5 which, during normal operation of the receiver, operates to supply an output signal which is a square-wave signal, the frequency of which is at any instant the same as that of the received signal. The output signal from the amplitude discriminator 5 is supplied by way of a filter and buffer stage 6 (FIGURE 2) to a frequency discriminator and detector stage 7 which supplies a square pulse output signal which is supplied to an output stage 8 where it is rectified and utilized to control the condition of an output relay 9.

During normal operation of the receiver the condition of the relay 9 at any instant is dependent upon the frequency of the received signal, the relay 9 being released when the received signal has its higher frequency and operated when the received signal has its lower frequency, or vice versa if required.

The relay 9 is preferably a mercury wetted reed relay in order that it will give reliable working at the speed of operation required, and long life.

If the amplitude of the received signal falls to a certain value below which the receiver is not required to operate the relay 9 is clamped in the operated condition irrespective of the frequency of the received signal.

Referring now to the amplifier stage 4 in more detail, this comprises two p-n-p junction transistors 10 and 11 both connected as common-emitter configuration amplifiers, the output signal from the collector electrode of the transistor 10 being supplied as the input signal to the base electrode of the transistor 11. A negative feedback path, comprising a resistor 12, two silicon diodes 13 and 14, and a capacitor 15, is connected between the collector electrode of the transistor 11 and the emitter electrode of the transistor 10. This feedback path operates so that, when the peak signal amplitude appearing at the junction of the resistor 12 and the diodes 13 and 14 exceeds the voltage to the "knee" of the voltage/current characteristic of the diodes 13 and 14, these diodes alternately pass appreciable current as feedback to the transistor 10 during alternate half cycles of the signal. Overall this has the effect of reducing the peak amplitude of the output signal supplied by the amplifier stage 4.

Referring now to the amplitude discriminator 5 in more detail, this comprises a pair of p-n-p junction transistors 16 and 17 connected together with a common emitter electrode load resistor 53 so as to operate together in known manner as a triggered bistable arrangement. Thus resistors 47 and 48 are connected in the collector electrode circuits of the transistors 16 and 17, the collector electrode of the transistor 16 is coupled to the base electrode of the transistor 17 by way of a capacitor 49 and a resistor 50, and resistors 51 and 52 are provided in the base electrode circuits of these two transistors respectively.

The output signal from the amplifier stage 4 is supplied by way of a resistor 19 and a capacitor 20 to the base electrode of the transistor 16. On the positive-going half cycles of the signal from the amplifier stage 4, the transistor 16 becomes nonconducting, the transistor 17 thus becoming conducting, and on the negative going half cycles of this signal the transistor 16 becomes conducting and the transistor 17 becomes nonconducting. The transistors 16 and 17 are arranged such that the amplitude of the signal supplied to the base electrode of the transistor 16 has to be above a predetermined value in order to effect triggering of the bistable arrangement. The gain of the amplifier stage 4 is set such that if the amplitude of the received signal is below a certain value, the amplitude of the signal supplied to the base electrode of the transistor 16 is below the predetermined value, and the bistable arrangement is thus not triggered.

Thus, for received signals which have an amplitude above a certain value the amplitude discriminator stage 5 supplies a square wave output signal the frequency of which is, at any instant, the same as that of the received signal, this output signal being derived from the collector electrode of the transistor 17. If the amplitude of the received signal falls below the certain value the bistable arrangement is not triggered, and the amplitude discriminator stage 5 does not supply any output signal.

Referring now to the filter and buffer stage 6 (FIGURE 2) in more detail, this comprises a p-n-p junction transistor 21 with a tuned circuit comprising an inductor 23 and a capacitor 24 connected across its base-emitter junction. The tuned circuit formed by the inductor 23 and the capacitor 24 is tuned to the mid-channel frequency of the received signal and operates as a band-pass filter removing the harmonics from the signal which is supplied by the amplitude discriminator stage 5 to the base electrode of the transistor 21 by way of a resistor 27. The transistor 21 operates in known manner as an amplifier, and the output signal from the filter and buffer stage 6 is derived from the emitter electrode of the transistor 21 by way of a capacitor 28 and a resistor 29.

Referring now to the frequency discriminator stage 7 in more detail, this comprises a p-n-p junction transistor 22 with a tuned circuit comprising an inductor 25 and a capacitor 26 connected across its base-emitter junction. The output signal from the filter and buffer stage 6 is supplied to the base electrode of the transistor 22.

The tuned circuit formed by the inductor 25 and the capacitor 26 is tuned to a frequency which is 55 cycles per second higher than the mid-channel frequency of the received signal. Thus, the arrangement is such that when the received signal has its higher frequency the amplitude of the signal supplied to the base electrode of the transistor 22 is greater than that when the received signal has its lower frequency.

The transistor 22 has a fixed emitter bias which is determined by resistors 30 and 31, and this bias is set such that the amplitude to the signal supplied to the base electrode of the transistor 22 when the received signal has its mid-channel frequency is just sufficient to render the transistor 22 partially conducting.

Thus, when the received signal has its higher frequency the transistor 22 is fully conducting for part of the cycle of the received signal, and supplies a square pulse signal at its collector electrode, but when the received signal has its lower frequency the transistor 22 is not conducting during any part of the cycle of the received signal, and does not supply any output signal.

The signal appearing at the collector electrode of the transistor 22 is supplied to the primary winding of a transformer 32, and the output signal from the frequency discriminator and detector stage 7 is derived from across the secondary winding of the transformer 32.

A diode 33 is connected across the primary winding of the transformer 32 as a path for any voltage surges due to the inductance of the transformer 32.

Referring now to the output stage 8 in more detail, the signal appearing across the secondary winding of the transformer 32 is rectified by a diode 34, and then smoothed by a network comprising capacitors 35 and 36, and a resistor 37 before being supplied to the base electrode of a p-n-p junction transistor 38. The transistor 38 has the relay 9 connected to its collector electrode, the relay 9 being shunted by a diode 39 which acts as a path for any voltage surges due to the inductance of the relay 9.

When there is no signal appearing across the secondary winding of the transformer 32, i.e. when the received signal has its lower frequency, the bias applied to the base electrode of the transistor 38 is determined by a resistor 40 and a diode 41, and is such that the transistor 38 is conducting, and current is supplied to the relay 9 such that it is operated. When the received signal has its higher frequency, the signal appearing across the secondary winding of the transformer 32 is such as to render the transistor 38 non-conducting, and no current is supplied to the relay 9 and it is released.

Thus at any instant during normal operation of the receiver the condition of the relay 9 is characteristic of the frequency of the received signal, the relay 9 being operated when the received signal has its lower frequency and released when it has its higher frequency.

Further, as previously described, if the amplitude of the received signal falls below a certain value the amplitude discriminator stage 5 does not supply any output signal, and thus no signal appears across the secondary winding of the transformer 32 in the frequency discriminator and detector stage 7, and the relay 9 remains in the operated condition irrespective of the frequency of the received signal.

Referring now to FIGURE 4 contacts 42 of the relay 9 operate to control the potential of the final output signal supplied by the receiver at output terminal 43. When the relay 9 is released its contacts 42 connect a +80 volts supply from a terminal 44 to the output terminal 43 by way of a resistor 45, and when the relay 9 is operated its contacts 42 connect a −80 volts supply from a terminal 46 to the oputput terminal 43 by way of the resistor 45.

By returning the tuned circuit formed by the inductor 25 and the capacitor 26 to a frequency which is 55c/s below the mid-channel frequency of the received signal, the frequency discriminator and detector stage 7 may be arranged to supply an output signal when the received signal has its lower frequency and not when it has its higher frequency. The relay 9 is thus now operated when the received signal has its higher frequency, and released when it has its lower frequency, the relay 9 still being held operated if the amplitude of the received signal should fall below the certain value.

The receiver may be modified alternatively to clamp the relay 9 in the released condition if the amplitude of the received signal falls below the certain value. In this case the biasing of the transistor 38 is arranged such that the transistor 38 is non-conducting when there is no signal appearing across the secondary winding of the transformer 32, and the connections of the diode 34 are arranged such that the transistor 38 is conducting when there is a signal appearing across the secondary winding of the transformer 32.

In one example of the receiver described above, preferred values for some of the components are given below:

| | Ohms |
|---|---|
| Resistors **47** and **48** | 3,000 |
| Resistors **49** and **50** | 36,000 |
| Resistors **51** and **52** | 8,200 |
| Resistor **53** | 75 |

An alternative method to the one described above of switching the bistable arrangement, comprising the transistors 16 and 17, in the amplitude discriminator stage 5, is to modify the connections to the transistor 11 in the amplifier stage 4 such that it operates as a phase splitter, and to switch the bistable arrangement by means of the two anti-phase signals supplied thereby. This is accomplished by providing a path comprising a resistor and a capacitor connected in series between the emitter electrode of the transistor 11 and the base electrode of the transistor 17, and adjusting the values of the emitter and collector electrode load resistances of the transistor 11 to the same value.

The detector stage 7 may be modified by connecting the junction of the resistor 54 and the crystal diode 55 to the centre tapping of the inductor 25 instead of to one end thereof. The base electrode of the transistor 22 is then connected to one end of the tuned circuit formed by the inductor 25 and the capacitor 26 while the base electrode of a further transistor is connected to the other end of this tuned circuit, the emitter and collector electrodes of the further transistor being connected respectively to the emitter and collector electrodes of the transistor 22. With this modified arrangement it will be appreciated that one or other of the transistor 22 and the further transistor is caused to conduct during every half cycle of the input oscillations so that the diode 34 then conducts during every half cycle (as compared with only conducting during alternate half cycles in the previous arrangement).

I claim:

1. A frequency-shift data receiver comprising an input path, an amplitude discriminator formed by a bistable circuit which comprises first and second transistors each having three electrodes, a first resistive element connecting a first electrode of each transistor to a first point, second and third resistive elements connecting a second electrode of each transistor respectively to a second point, a connection between the second electrode of the first transistor and the third electrode of the second transistor, a connection between the second electrode of the second transistor and the third electrode of the first transistor, and means to provide a potential difference between said first and second points, an amplifier stage connected between the said input path and the third electrode of the first transistor, and data demodulating means responsive to the frequency of signal passed by the amplitude discriminator, the arrangement being such that said bistable circuit is triggered from a first stable condition in which said first transistor is conducting and said second transistor is not conducting to a second stable condition in which said second transistor is conducting and said first transistor is not conducting and back again continuously in dependence upon the instantaneous amplitude of the signal supplied thereto by the amplifier stage and said bistable circuit being so triggered to supply to the data demodulating means a square-wave output signal of substantially constant amplitude only when the level of said signal passed by the amplifier stage is above a predetermined value.

2. An amplitude discriminator according to claim 1 wherein each of said first and second transistors is a junction transistor, each having a respective emitter, collector and base electrode, said first electrode being the emitter electrode, said second electrode being the collector electrode, and said third electrode being the base electrode.

3. A frequency-shift data receiver comprising an input path, an amplitude-dependent circuit that only passes signals having an amplitude exceeding a predetermined value, circuit means to connect the input path and the amplitude-dependent circuit, an output path, output means to supply to the output path a signal having selectively one or other of two steady voltage values, and a frequency-dependent circuit having a frequency dependent transmission characteristic connected between the amplitude-dependent circuit and the output means so that the signal passed by the frequency-dependent circuit is utilized to control the output means whereby the voltage on the output path is determined by the frequency of the signal passed by the amplitude-dependent circuit, and thus by the frequency of signals supplied over said input path, the amplitude-responsive circuit comprising a bistable circuit which is triggered from one of its stable states to the other to provide a substantially square-wave signal that is passed to said frequency-dependent circuit in dependence upon the instantaneous amplitude of the signal supplied thereto provided the level of that signal exceeds a predetermined value.

4. A frequency-shift data receiver according to claim 3 wherein said bistable circuit is formed by a pair of junction transistors having common resistance connected in their emitter electrode circuits and cross-coupling between the collector electrode of each transistor and the base electrode of the other transistor.

5. In a frequency-shift telegraphy receiver having a frequency discriminator, a bistable circuit which, during use, is triggered from one of its stable states to the other and back again continuously in dependence upon the instantaneous amplitude of the received signal, circuit means to connect the bistable circuit and the frequency discriminator so as normally to pass to the frequency discriminator a substantially square wave signal carrying the intelligence of the received signal, and means to inhibit operation of the bistable circuit upon the level of the received signal falling below a predetermined value.

6. In a frequency-shift data receiver comprising an input path, a frequency discriminator, and circuit means connected between said input path and said discriminator, said circuit means comprises a bistable circuit formed by a pair of junction transistors having common resistance connected in their emitter electrode circuits and cross-coupling between the collector electrode of each transistor and the base electrode of the other transistor, means responsive to a positive-going voltage waveform of a signal on said input path to supply a signal to trigger the bistable circuit to one of its stable states, provided that signal is of sufficient level, means responsive to a negative-going voltage waveform of a signal on said input path to supply a signal to trigger the bistable circuit to its other state provided that signal is of sufficient level, and further circuit means connecting the bistable circuit to the frequency discriminator so as to pass to the frequency discriminator a signal carrying the intelligence of the signal received over said input path only when the level of that signal exceeds a predetermined value.

References Cited

UNITED STATES PATENTS

| | | | |
|---|---|---|---|
| 2,507,730 | 5/1950 | Mitchell | 325—320 |
| 3,225,216 | 12/1965 | Grabowski | 307—885 |

ALFRED L. BRODY, *Primary Examiner.*